Dec. 19, 1944. K. SCHULZE 2,365,439
GYROSCOPIC INSTRUMENT
Filed Dec. 12, 1941

INVENTOR.
Kurt Schulze
BY
Cerstvik and Kalman
ATTORNEYS.

Patented Dec. 19, 1944

2,365,439

UNITED STATES PATENT OFFICE 2,365,439

GYROSCOPIC INSTRUMENT

Kurt Schulze, Dallgow-Döberitz, Germany; vested in the Alien Property Custodian

Application December 12, 1941, Serial No. 422,760
In Germany September 4, 1939

6 Claims. (Cl. 33—204)

This invention relates to a gyroscopic instrument for indicating the angular acceleration of a mobile vehicle, as for example, an aircraft.

It has heretofore been proposed, as in U. S. Patent No. 2,290,232 of Franz Fischer, to provide means for indicating the angular acceleration of bodies, for example, by utilizing and measuring the precession speed of a banking indicator gyro which measures the velocity of angular movement. In such means, a differentiation device is connected with the turn or banking indicator gyro in such a manner that the precession shaft of a measuring member, which can be separately displaced against the action of an elastic force, e. g., a member which indicates directly the angular acceleration, is operatively connected with an eddy current system, whose coupling power is a function of the speed of the displacing movement. One member acts as both measuring member and eddy current member, and is disposed eccentrically with respect to the precession axis of the gyro, the end of said member lying between the poles of a U-shaped magnet. Whenever a precession of the banking indicator gyro occurs, the magnet will either tend to arrest or brake the eddy current member or to accelerate its movement, depending upon the arrangement. The force of the eddy currents is proportional to the precession speed and consequently to the acceleration of the angular movement acting upon the gyro.

The illustrated embodiment of the invention herein proposed and hereinafter described, by an original means of installing a separate measuring and indicating member and a separate eddy current member, and by a symmetrical disposition of the magnet about the axis of precession, by a torsionally-elastic sleeve, and by a novel means of operatively interconnecting the precession shaft, the eddy current member, and the measuring member together will result in a marked improvement over devices heretofore known.

In the present invention, an eddy current system is disposed about the precession axis. The measuring member has the form of a pointer and is freely suspended on the precession shaft. Inasmuch as the eddy current member and the magnet system are symmetrically disposed around the precession shaft, the eddy current member will always be under the full influence of the magnet, whether the deflection be large or small, and this feature will lend the novel apparatus disclosed herein the maximum capacity for accuracy. It will also be made clear from the accompanying drawing and the following description that the device is of great compactness; and this added to the fact that it is substantially vibration-proof will make it particularly suited for use in aircraft.

The above and additional objects and original features of this novel device will be more fully pointed out in the following description and the appended drawing. The latter, however, is submitted with the object of illustration and simplification only, and is not to be construed as circumscribing the possibilities of the employment of this invention, nor of limiting the manner in which it may be mounted in an aircraft or other body.

In the drawing, in which like reference characters refer to like parts throughout:

Figure 1:
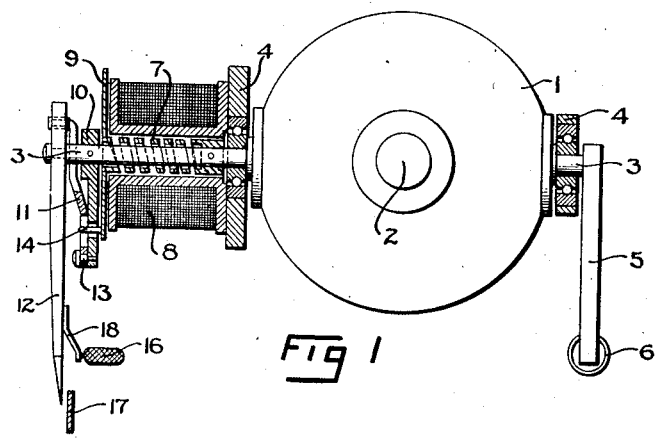
Fig. 1 represents a front elevation, partly in section, of one embodiment of this invention, showing one way of mounting it in an aircraft.

The drawing thus shows three views of one embodiment of this invention comprising an aircraft turn or banking indicator gyro of orthodox design. The gyro, which rotates, for example, in the vertical plane, about an axis 2, which axis lies in the horizontal plane and extends, for example, fore and aft of the aircraft, is enclosed in a housing or gimbal frame 1. A horizontal precession shaft or axis 3, 3, which consists of two parts, each of which is rigidly secured to the gimbal frame, extends, for example, athwartships of the aircraft. Precession shaft 3 is mounted in bearings 4, 4, which bearings are fixed to the aircraft, or other body whose angular movement is to be measured. On one end of the precession shaft is pinned, or otherwise rigidly fastened, an arm 5, whose motion is restricted by rigidly anchored shackle springs 6, 6. These springs restrain, but do not prohibit, the precessional rotation of the shaft 3, 3. The indicating member or pointer is mounted at the other end of said shaft. A torsionally-elastic sleeve 7 is at one end pinned, or otherwise fixed, to the precession shaft (Fig. 1). Sleeve 7 is of appreciable length and is constructed preferably of some suitable material, such as, for example, a coil spring, so that it will respond readily to torsional twisting. The said sleeve carries on its free end an eddy current member 9. This eddy current member, which may preferably have the shape of a plate, such as, for example, a circular disc, with a hole in the center to accommodate the precession shaft, is preferably of some non-magnetic but conducting material, such as, for example, copper. The fact that the sleeve is of appreciable length and of resilient material will thus permit the disc to have its motion arrested by braking without communicating a material torque to the precession shaft where it is pinned at the sleeve's other end. In other words, when a braking force is applied to the disc, the sleeve will twist readily and will not interfere with free precessional movements of the shaft, even though shaft and sleeve are pinned together at one end of the latter. Eddy current member 9 rotates in front of a stationary magnet system 8, for example, a field coil of the orthodox annular ring shape, which is preferably concentrically and symmetrically disposed around sleeve 7 and shaft 3. An intermediate member 10, which may have preferably the shape of a segment of a circular disc, is pinned, keyed, or otherwise immovably fixed to the precession shaft 3, so that it will faithfully follow the precessional movements of the shaft. A measuring member 12, having, for example, the form of a pointer, is mounted in a freely turning manner on the end of shaft 3 adjacent segment 10; that is, pointer 12 will turn freely as far as its bearing on the shaft is concerned, but its movements are regulated by other considerations, as will be hereinafter shown.

Figure 2:
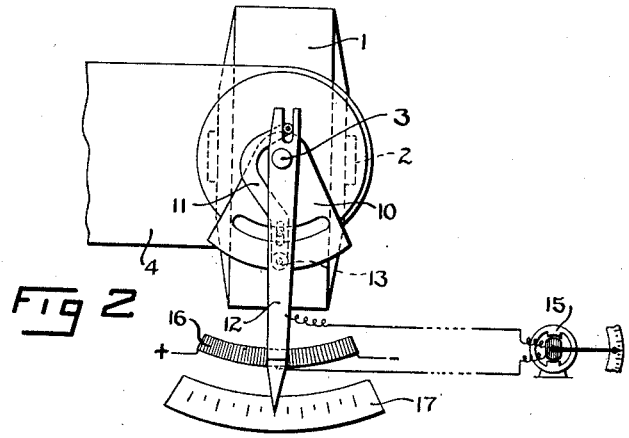
Fig. 2 represents a side elevation of this invention, i. e., an end view as seen from the end on which the measuring member, or pointer, is mounted.
Figure 3:
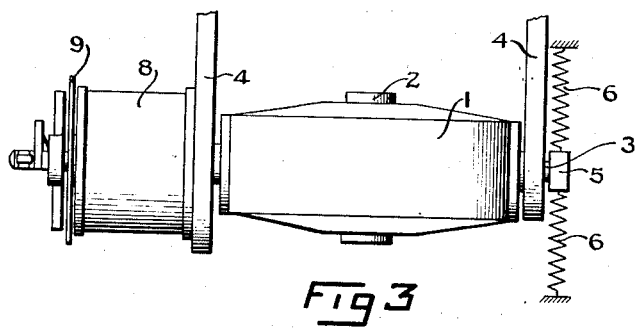
Fig. 3 is a top or plan view of the structure shown in Figs. 1 and 2.

A member 11, having, for example, the form of a curved lever or link, operatively interconnects the eddy current member 9, the intermediate member or segment 10, and measuring member 12, and thus provides for actuating said measuring member or pointer. The connection is, for example, as follows: member 11 is pivoted at its fulcrum 13 by a connection to segment 10 in a freely turning manner. A pin 14, fixed in the eddy current member 9, extends through an arc-shaped slot in segment 10 and engages the connecting member 11 in a vertical slot as shown in Figs. 1 and 2. Pin 14 does not touch member 10 as the arc-shaped slot is sufficiently wide to prevent this, but it bears against the sides of the vertical slot in link 11 and thus connects eddy current member 9 to said link. Pointer 12 moves back and forth over a registering dial 17 as it is actuated by link 11 in response to precession of the shaft.

The values as indicated by the measurement may be read by electrical or mechanical registering devices or by optical means, or the measurement may be transmitted to other stations by an electrical repeater system. Figs. 1 and 2 show one embodiment of such a system, in which, for example, a sliding contact 18 fixed to the pointer 12 slides back and forth as the pointer is moved over an arc-shaped core about which is disposed a potentiometer winding 16. Each end of the said winding being of different potential, it follows that the center is of zero potential. A repeater or indicator 15, which may be located at some distance, has one lead connected, for example, to the pointer 12; and another lead to the center of the potentiometer winding, the point of zero potential. When the pointer is at the zero position, there will be no reading on the instrument or repeater 15, but any other position of the pointer will be accompanied by a corresponding deflection of the repeater to indicate remotely the same value as that registered by pointer 12 on scale 17.

The operation of the device is as follows: when the body, for example, an airplane in which the device is installed, is set in motion about the vertical axis, which in the embodiment as shown is the sensitivity axis of the gyro, the gyro will begin to precess, that is, it will rotate about the precession axis 3, 3 against the tension of springs 6, 6. This turning of the shaft 3, 3 will be communicated in a like degree directly to segment 10, since it is fixed to the shaft, and this displacement in magnitude and direction corresponds to the angular velocity of the said angular movement. If there were no magnet system, eddy current member 9 would also turn with the shaft by virtue of its connection through sleeve 7. However, with the magnet system, as soon as member 9 starts to rotate with the shaft, this relative motion to the magnet will generate eddy currents in said member, and these eddy currents will exert a strong braking effect, preventing free movement of the member in either direction. This braking effect will not be communicated back in any appreciable degree to the precession shaft, since the torsional flexibility of the sleeve 7 will permit it to readily twist under the influence of the braking effect on the disc. There thus results, whenever precession takes place, a relative displacement between segment 10 and disc 9, since the former moves directly with shaft rotation and the latter is prevented from so doing by the braking effect of the eddy currents.

It should be borne in mind that the braking effect of the eddy currents on the disc is dynamic, which is to say that it can only exist when the disc is in motion, and that it increases as the motion tends to increase. Thus the disc will lag behind any rotational motion of the precession shaft (angular acceleration of the aircraft), but if and when the shaft turns to a certain angle and then comes to rest and retains such angle, the disc will gradually move over to its corresponding position. In other words, the eddy currents will not stop motion of the disc entirely, but will inhibit any sudden or fast motion.

There is thus provided novel means of the type wherein measurements dependent on the angular acceleration of a craft, such as an aircraft, are obtained, said means constituting a space saving and vibration-proof instrument.

What is claimed is:

1. In a gyroscopic instrument responsive to angular acceleration of an aircraft and the like during turning about an axis thereof, comprising a two-degree-of-freedom gyroscope having a rotor, a gimbal frame mounting said rotor for spinning about an axis perpendicular to the axis of turn of said craft and for precession about an axis mutually perpendicular to said spin axis and said turn axis, yielding means for opposing said precession whereby the amount of said precession is a function of the rate of turn of said craft, the combination therewith of a precession shaft coaxial with said precession axis and adapted for rotation with said frame, eddy current braking means including means for creating a magnetic field symmetrically disposed around the said precession shaft and fixed with reference to the said craft and an armature member resiliently connected to the said precession shaft and disposed in said magnetic field so as to operate under the combined influence of the said magnetic field and the motion of the said precession shaft, and indicating means including a member pivoting about the said precession shaft and operatively connected by mechanical interlinking both to said precession shaft and the said armature member so that motion is imparted to said indicating means by said shaft and said motion is modified by said eddy current braking means in accordance with the speed of said shaft.

2. In gyroscopic instruments responsive to angular acceleration of aircraft or the like, the combination with a two-degree-of-freedom gyroscope having a precession shaft of an eddy current braking means including means for creating a magnetic field disposed about the precession shaft of the said gyroscope and fixed with reference to the said aircraft and an armature member disposed around the said precession shaft and resiliently attached thereto and thereby operating under the combined influence of the said magnetic field and the motion of the said precession shaft, indicating means including a member pivoting about the said precession axis, and a means for coupling together the said armature member, the said precession shaft, and the said indicating means whereby to indicate motion of the said armature member and the said precession shaft.

3. In an instrument responsive to angular acceleration of a vehicle about an axis, said instrument being of the type embodying a gyroscope and a precession shaft supporting said gyroscope for precession and arranged so that the amplitude of precession thereof is a function of the rate of turn of said vehicle, the combination with said shaft of stationary magnetic field producing means mounted coaxially of the shaft, an eddy current member operatively associated with said means so as to have the motion thereof retarded in accordance with the speed of said motion, yielding means for connecting said member to said shaft, an indicator pointer pivoted on said shaft, and means operatively connected to said shaft member and pointer for actuating said pointer so that said shaft tends to impart pivotal movement to said pointer in accordance with the angle of displacement thereof and said member modifies said movement in accordance with the rate of the angular displacement of said shaft.

4. In an instrument responsive to angular acceleration of a vehicle about an axis, said instrument being of the type embodying a gyroscope and a precession shaft supporting said gyroscope for precession, the combination with said shaft of an eddy current member arranged turnably and coaxially of said shaft, yielding means for securing said eddy current member to said shaft, means providing a stationary magnetic field for said member, indicating means carried by said shaft, and means connecting said indicating means to said shaft and to said eddy current member whereby said yielding means which secures the eddy current member to said shaft modifies the movement of said indicating member that is caused by the movement of said shaft.

5. In a gyroscopic instrument responsive to angular acceleration of an aircraft and the like during turning about an axis thereof, comprising a two-degree-of-freedom gyroscope having a rotor, a gimbal frame mounting said rotor for spinning about an axis perpendicular to the axis of turn of said craft and for precession about an axis mutually perpendicular to said spin axis and said turn axis, yielding means for opposing said precession arranged so that the amount of said precession is a function of the rate of turn of said craft and the rate of said precession is a function of the acceleration of turn of said craft, the combination therewith of a precession shaft coaxial with said precession axis and secured to said frame for rotation therewith, magnetic field producing means for producing a constant strength field disposed about the said precession shaft and fixed with reference to the said craft, eddy current braking means comprising a member resiliently connected to the said precession shaft and disposed in said magnetic field so as to operate under the combined influence of the said precession axis and the said magnetic field, an indicating member, and means operatively connecting said indicating member to said precession shaft and to the said eddy current braking means, whereby said shaft tends to impart rotary movement to the indicating means in accordance with the amplitude of displacement thereof and the eddy current braking means modifies said movement in accordance with the rate of the angular displacement of said shaft.

6. A gyroscopic instrument comprising a two-degree-of-freedom gyro having a rotor, a gimbal frame mounting said rotor for spinning about a shaft perpendicular to the axis of turn of said craft and for precession about a shaft mutually perpendicular to said spin shaft and said turn axis, yielding means for restraining said precession whereby the amount of said precession is a function of the rate of turn of said craft and the rate of said precession is a function of the acceleration of turn of said craft, magnetic field producing means disposed concentrically relative to said precession shaft and fixed with reference to the said craft, eddy current braking means comprising a member resiliently connected to the said precession shaft and in said magnetic field, indicating means, and means operatively connecting said indicating means to said eddy current braking means and precession shaft whereby motion imparted to said indicating means on precession of said gyro is a function of the rotational displacement and rotational velocity of said precession shaft.

KURT SCHULZE.